(12) United States Patent
Colombier et al.

(10) Patent No.: US 12,182,842 B2
(45) Date of Patent: Dec. 31, 2024

(54) SYSTEM AND METHOD FOR DETERMINING AN ATTRACTIVENESS VALUE OF A PRODUCT DISPLAYED ON AN ONLINE PLATFORM, AND GENERATING INSIGHTS RESPECTIVE THEREOF

(71) Applicant: Content Square SAS, Paris (FR)

(72) Inventors: Michael Colombier, Paris (FR); Martin De Charette, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/032,166

(22) Filed: Sep. 25, 2020

(65) Prior Publication Data
US 2022/0101402 A1 Mar. 31, 2022

(51) Int. Cl.
| | | |
|---|---|---|
| *G06Q 30/00* | (2023.01) | |
| *G06Q 10/0639* | (2023.01) | |
| *G06Q 30/0201* | (2023.01) | |
| *G06Q 30/0601* | (2023.01) | |

(52) U.S. Cl.
CPC ... *G06Q 30/0625* (2013.01); *G06Q 10/06393* (2013.01); *G06Q 30/0201* (2013.01); *G06Q 30/0643* (2013.01)

(58) Field of Classification Search
CPC .......... G06Q 30/0625; G06Q 30/0201; G06Q 30/0643; G06Q 10/06393
See application file for complete search history.

(56) References Cited

U.S. PATENT DOCUMENTS

| | | | |
|---|---|---|---|
| 6,853,982 B2 | 2/2005 | Smith et al. | |
| 7,921,135 B2* | 4/2011 | Roche | G06Q 30/0631 |
| | | | 705/26.7 |
| 9,367,524 B1* | 6/2016 | Filev | G06Q 30/0244 |
| 10,235,688 B2* | 3/2019 | Beatty | G06Q 30/0219 |
| 2006/0089880 A1* | 4/2006 | Merriman | G06Q 30/02 |
| | | | 705/14.69 |
| 2007/0271352 A1* | 11/2007 | Khopkar | H04L 67/535 |
| | | | 709/217 |
| 2008/0189408 A1* | 8/2008 | Cancel | G06Q 10/04 |
| | | | 709/224 |

(Continued)

OTHER PUBLICATIONS

"Visualization and Analysis of Clickstream Data of Online Stores for Understanding Web Merchandising," by Juhnyoung Lee, Mark Podlaseck, Edith Schonberg, and Robert Hoch, Data Mining and Knowledge Discovery, 5, 59-84, 2001 (Year: 2001).*

(Continued)

*Primary Examiner* — Anne M Georgalas
(74) *Attorney, Agent, or Firm* — Schwegman Lundberg & Woessner, P.A.

(57) ABSTRACT

A system and method for determining an attractiveness value of a product displayed on a website. The method includes receiving sales data on at least one product displayed in a zone included in the webpage, determining at least one key performing indicators (KPI) on each of the at least one product from the received sales data, comparing the KPI of the at least one product displayed in the zone, determining the attractiveness value for each of the at least one product displayed in the zone, and an insight based on the comparison and the determined attractiveness value, and displaying an image of the at least one product, the KPI, and the insight on the display.

9 Claims, 9 Drawing Sheets

(56) References Cited

U.S. PATENT DOCUMENTS

| | | | | |
|---|---|---|---|---|
| 2008/0270164 A1* | 10/2008 | Kidder | ............... | G06Q 30/0241 |
| | | | | 705/14.4 |
| 2010/0042495 A1* | 2/2010 | Malden | .............. | G06Q 30/0249 |
| | | | | 705/14.48 |
| 2011/0258049 A1* | 10/2011 | Ramer | ............... | G06Q 30/0273 |
| | | | | 705/14.66 |
| 2013/0066707 A1* | 3/2013 | Umeda | .............. | G06Q 30/0272 |
| | | | | 705/14.42 |
| 2013/0138503 A1* | 5/2013 | Brown | ............... | G06Q 30/0203 |
| | | | | 705/14.45 |
| 2014/0297401 A1* | 10/2014 | Bax | .................... | G06Q 30/0275 |
| | | | | 705/14.71 |
| 2014/0358668 A1* | 12/2014 | Fredinburg | ............ | G06Q 30/02 |
| | | | | 705/14.66 |
| 2015/0066579 A1* | 3/2015 | de Paris | ............. | G06Q 30/0201 |
| | | | | 705/7.29 |

OTHER PUBLICATIONS

"The 60 Second Marketer: How to Pull Actionable Insights from Your SEO Metrics," Newstex Global Business Blogs, Mar. 16, 2020 (Year: 2020).*

* cited by examiner

Zone 220-1 performance

| Page Views | Click Rate/No. of Clicks | Attractiveness rate | Conversion rate & revenue | Product displayed |
|---|---|---|---|---|
| 1,425 | 25%/285 | 40% | 5%/$566,000 | All (32) |
| 130 | 5%/57 | 80% | 20%/$85,000 | TV X |
| 125 | 3%/4 | 40% | 15%/$1,000 | Shoe A |
| 100 | 100%/100 | 100% | 100%/$800 | Shirt B |

SYSTEM AND METHOD FOR DETERMINING AN ATTRACTIVENESS VALUE OF A PRODUCT DISPLAYED ON AN ONLINE PLATFORM, AND GENERATING INSIGHTS RESPECTIVE THEREOF

TECHNICAL FIELD

The present disclosure relates generally to activity tracking on websites, and more specifically, the disclosure is directed to a system and method for determining an attractiveness value of a product displayed on an online platform.

BACKGROUND

The Internet is a collection of disparate computer systems which use a common protocol to communicate with each other. A common use of the Internet is to access World Wide Web (web) pages. Web pages are typically stored on a server and remotely accessed by a client over the Internet using a web browser.

A web site is a collection of web pages. A web site includes typically a home page and a hierarchical order of follow on web pages that are accessible through the home page. The web pages are connected to each other using hypertext links. The links allow a user to browse web pages of a web site by selecting the links between the web pages. Distinct Web sites may be respectively identified by respective distinct associated Internet domain names.

Display of products for sale online has become prominent in recent years. Users are directed to a website displayed over the Internet, or are sent links via social media or text messages that direct them to a website where merchandise is displayed. To increase user visitations and revenue from sale of the product online, web sites have become very sophisticated. Web sites typically include web pages that provide images of the products to users. However, it is difficult to determine the effectiveness of product placement locations or the value of the images themselves within websites in generating activity from the users, and whether the visibility of the product displayed within a certain zone of the webpage affect the corresponding product's sales.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a system and method for determining an attractiveness value of a product displayed on a website. The method includes receiving sales data on at least one product displayed in a zone included in the webpage, determining at least one key performing indicators (KPI) on each of the at least one product from the received sales data, comparing the KPI of the at least one product displayed in the zone, determining the attractiveness value for each of the at least one product displayed in the zone, and an insight based on the comparison and the determined attractiveness value, and displaying an image of the at least one product, the KPI, and the insight on the display.

Certain embodiments disclosed herein also include a non-transitory computer readable medium having stored thereon causing a processing circuitry to execute a process, the process includes receiving sales data on at least one product displayed in a zone included in the webpage, determining at least one key performing indicators (KPI) on each of the at least one product from the received sales data, comparing the KPI of the at least one product displayed in the zone, determining the attractiveness value for each of the at least one product displayed in the zone, and an insight based on the comparison and the determined attractiveness value, and displaying an image of the at least one product, the KPI, and the insight on the display.

Certain embodiments disclosed herein also include a system for determining an attractiveness value of a product displayed on a website. The system includes a processing circuitry and a memory, the memory containing instructions that, when executed by the processing circuitry, configure the system to receive sales data on at least one product displayed in a zone included in the webpage, determine at least one key performing indicators (KPI) on each of the at least one product from the received sales data, compare the KPI of the at least one product displayed in the zone, determine the attractiveness value for each of the at least one product displayed in the zone, and an insight based on the comparison and the determined attractiveness value, and display an image of the at least one product, the KPI, and the insight on the display.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some example embodiments include a method and system for determining an attractiveness value of a product displayed on a website. Sales data including key performing indicators (KPI) on a plurality of products is received and displayed in a zone of a website that is displayed on a display of a user device. The KPI among the plurality of products displayed in the zone is compared, and an attractiveness value for each of the plurality of products is determined based on the comparison. Based on the comparison and the determined attractiveness value, an insight including a recommendation is determined. An image of the plurality of products, the KPI, and the insight are then displayed on the display.

Figure 1:
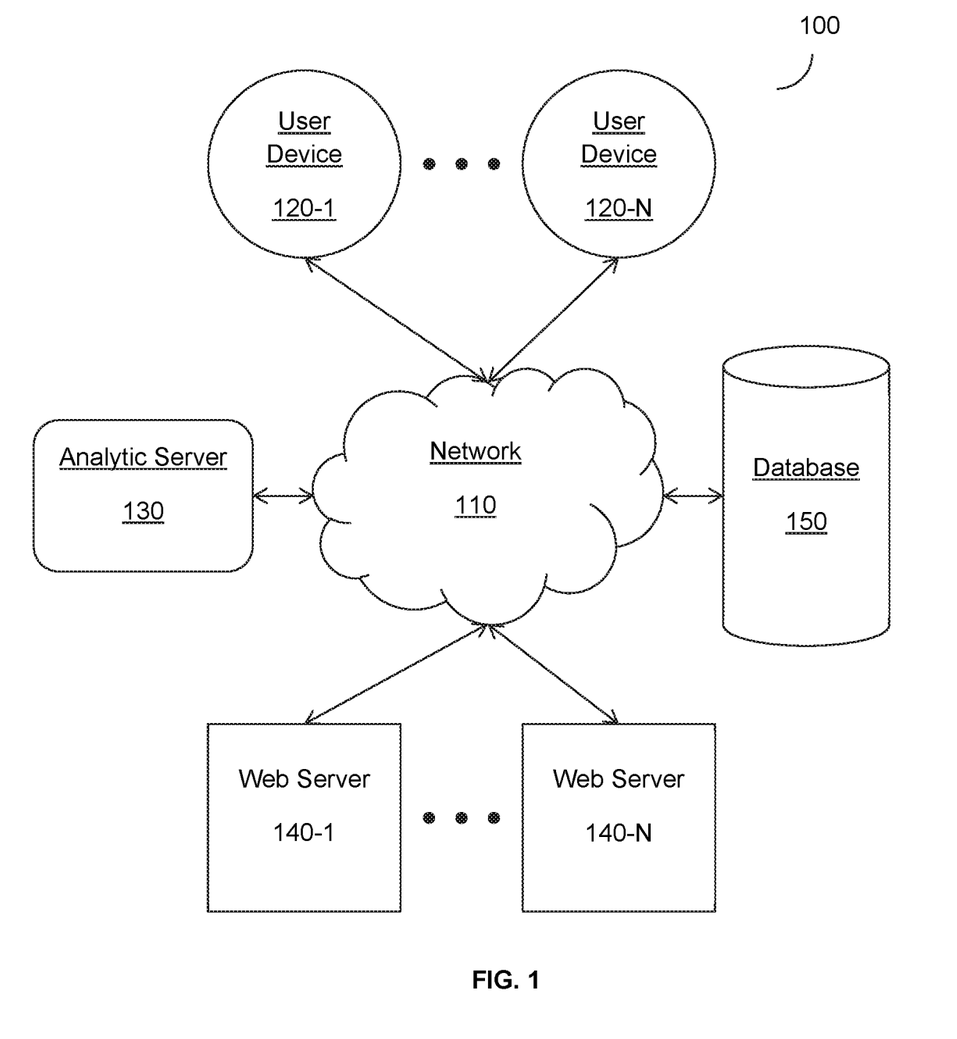
FIG. 1 is an example network diagram depicting a network system disclosing the embodiments for automatic detection of webpage zones of interest.

FIG. 1 is an example network diagram depicting a network system 100 utilized to describe the various embodiments. The system 100 includes one or more user devices, 120-1 through 120-N (hereinafter, "user device" 120 or "user devices" 120), an analytic server 130, one or more web servers, 140-1 through 140-N (hereinafter "web server" 140 or "web servers" 140), and a database 150. Further, in the system, the various components listed are interconnected via a network 110.

The network 110 provides interconnectivity between the various components of the system. The network 110 may be, but is not limited to, a wireless, cellular or wired network, a local area network (LAN), a wide area network (WAN), a metro area network (MAN), the Internet, the worldwide web (WWW), similar networks, and any combination thereof. The network may be a full-physical network, including exclusively physical hardware, a fully-virtual network, including only simulated or otherwise virtualized components, or a hybrid physical-virtual network, including both physical and virtualized components. Further, the network 110 may be configured to encrypt data, both at rest and in motion, and to transmit encrypted, unencrypted, or partially-encrypted data. The network 110 may be configured to connect to the various components of the system 100 via wireless means such as, as examples and without limitation, Bluetooth™, long-term evolution (LTE), Wi-Fi, other, like, wireless means, and any combination thereof, or via wired means such as, as examples and without limitation, Ethernet, universal serial bus (USB), other, like, wired means, and any combination thereof. Further, the network 110 may be configured to connect with the various components of the system 100 via any combination of wired and wireless means.

The user devices 120 may be devices allowing a user to interact with the system 100 for purposes including, as examples and without limitation, providing webpage analysis requests to the system 100 for detection and classification of content elements and zones, receiving classification reports from the system 100, configuring system 100 parameters, other, like, purposes, and any combination thereof. The user devices 120 may be devices configured to allow a user to receive information through features such as, for example and without limitation, video displays, audio speakers, text printers, and other output devices. The user devices 120 may be further configured to allow a user to input information. Further, the user devices 120 may be configured to allow users to simultaneously receive and input information. The user devices 120 may include one or more components configured to provide network connectivity, allowing the user devices 120 to connect with the network 110, including by the means described with respect to the network 110, above. Examples of user devices 120 may be smartphones, personal computers, business systems, dedicated kiosks, tablet computers, and other, like, devices.

The analytic server 130, depicted in detail with respect to FIG. 9, below, is a system configured to execute instructions, organize information, and otherwise process data. The analytic server 130 may be configured to execute the methods described hereinbelow, other, like, methods, and any combination thereof. As described with respect to FIG. 9, below, the analytic server 130 may include various processing, memory, networking, and other components allowing the analytic server 130 to execute instructions and provide data processing. The analytic server 130 may be implemented as physical hardware, as software virtualizing physical hardware, or as a combination of physical and virtualized components. The analytic server 130 may be connected to the network 110 via those means described with respect to the network 110, above.

As will be discussed in detail below, the analytic server 130 is configured to identify zones within a webpage where products are sold, determine various products sold at different times in a particular zone or zones, analyze received sales data to determine Key Performing Indicators (KPI) for each of the products, compare these KPI, determine an attractiveness value for each of the products based on the compared KPI, determine certain insights based on the comparison and the determined attractiveness values, and output the KPI and the insights for the user on the user device 120.

That is, the analytic server 130 may be configured to identify zones of interest within websites and webpages. A zone is an area in a webpage including one or more objects. Such zones may be features of common web technologies such as Hypertext Markup Language (HTML) and Cascading Style Sheets (CSS), and may provide for rich user interactions with a website or page. As an example, an online retailer's page may include zones or elements allowing users to search for products, to add products to a digital shopping cart, to contact a retailer's support specialist via a chat popup, and the like.

A zone of interest may be a webpage zone or element directed to a particular function or aspect of the user experience, where various zones of interest may be defined in various contexts, including by manual specification of specific zones of interest and automatic identification of zones of interest based on factors including, without limitation, collected site usage data, intended site functions, such as social, shopping, and the like, other, like, factors, and any combination thereof. An example of a zone of interest may be a predefined area within a website, selectable by a visitor or user of the website, wherein at least a product is displayed within the area for sale. The zone of interest may be distinguished from other zones in the same website not of interest to, and has not been selected by, the visitor to the website.

As will be discussed in detail below in FIGS. 2-7, the analytic server 130, in an embodiment, is configured to receive sales data on a plurality of products displayed for sale in a zone of a website. The sales data, which are gathered during transactions made by a user using the user device 120 to purchase, may be received from the database 150, web server 140, or the user device 120 over the network 110. The analytic server 130 may then be configured to determine various KPI for each of the product sold on the website, based on the sales data gathered. The results of the analysis may then be output for display on the user device 120, or be stored on the device 120, in the database 150, or the web server 140.

The web servers 140 may be one or more sources of data other than the inputs received from the user devices 120. The web servers 140 may include data relating to execution of instructions, data relating to the training of models, as described hereinbelow, other, like, data, and any combination thereof. Data from the web servers 140 may be stored in the database 150 and may be processed by the analytic server 130. Web servers 140 may be local sources, remote sources, or any combination thereof. Examples of web servers 140 include, without limitation, repositories of webpage information, repositories of webpage element or zone classifications, "live" webpages, other, like, sources, and any combination thereof. Web servers 140 may be connected with the network 110 via the means described hereinabove. In some configurations, the web sources 140 may include one or more data sources sorting content elements that can be utilized to train a model, as described hereinbelow.

According to the disclosed embodiments, the server 130 is configured to analyze of product placement effectiveness using processes including the receipt of a webpage analysis request, such as those described hereinbelow, the webpage analysis request may include a specification of a specific webpage, with the contents of the specific webpage being drawn, by the server 130, from the web servers 140.

The database 150 is a data store configured to archive data permanently or semi-permanently. The database 150 may be configured to store information received from one or more web servers 140, user devices 120, and other, like, components, as well as to store data relevant to the operation of the analytic server 130 and any outputs therefrom. The database 150 may be a local system, a remote system, or a hybrid remote-local system. Further, the database 150 may be configured as a full-physical system, including exclusively physical components, as a virtualized system, including only virtualized components, or as a hybrid physical-virtual system.

The database 150 may be configured to store or otherwise archive data relating to detection, identification, and classification of webpage zones and elements of interest including, without limitation, webpages, HTML code, Document Object Model (DOM) trees, training datasets, user inputs, other, like, data, and any combination thereof. Further, the database 150 may be configured to transfer, to and from the analytic server 130, data necessary for the execution of the methods described hereinbelow, and may store or otherwise archive analytic server 130 inputs, analytic server 130 outputs, or both.

Figure 2:
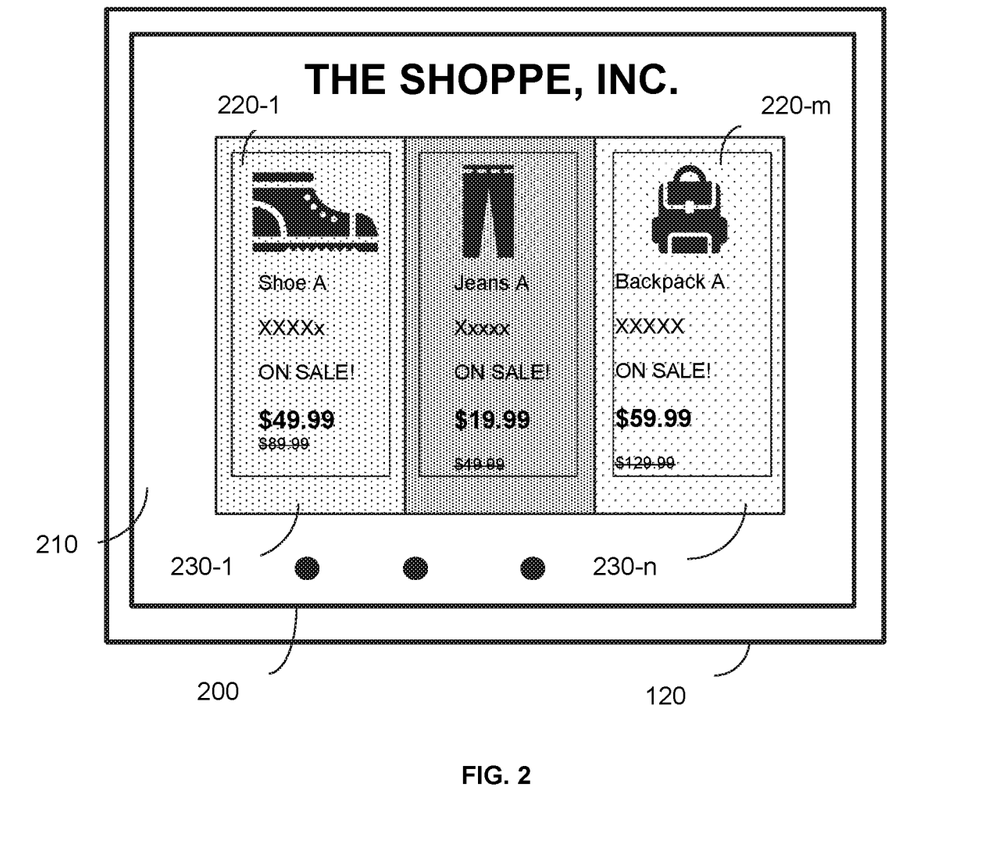
FIG. 2 is a detailed schematic view of the user device, according to an embodiment.

FIG. 2 is a detailed schematic view of the user device 120, according to an embodiment. The user device 120 includes a display that displays a website 210 selling different products, each of the products represented as an image 220-1 to 220-m (hereinafter image 220 or image 220) of a product for sale on the website 210.

The area of the website 210 is also divided into zones 230-1 to 230-n (hereinafter referred to as zone 230 or zones 230). A zone 230 is predefined and selectable by a user of the user device 120, when the user wishes to analyze sales data on a particular product or products in a specific zone 230. In an embodiment, upon selection of one of the zones 230 by the user, various sales data organized in to various KPIs may be displayed.

Returning to FIG. 2, the image 230, on the other hand, upon selection by the user when the user is navigating the website to browse products available for sale, brings the user to other web pages to reveal more information on the product. In an embodiment, more description of the product with options to purchase or add the product onto a virtual shopping cart.

Figure 3:
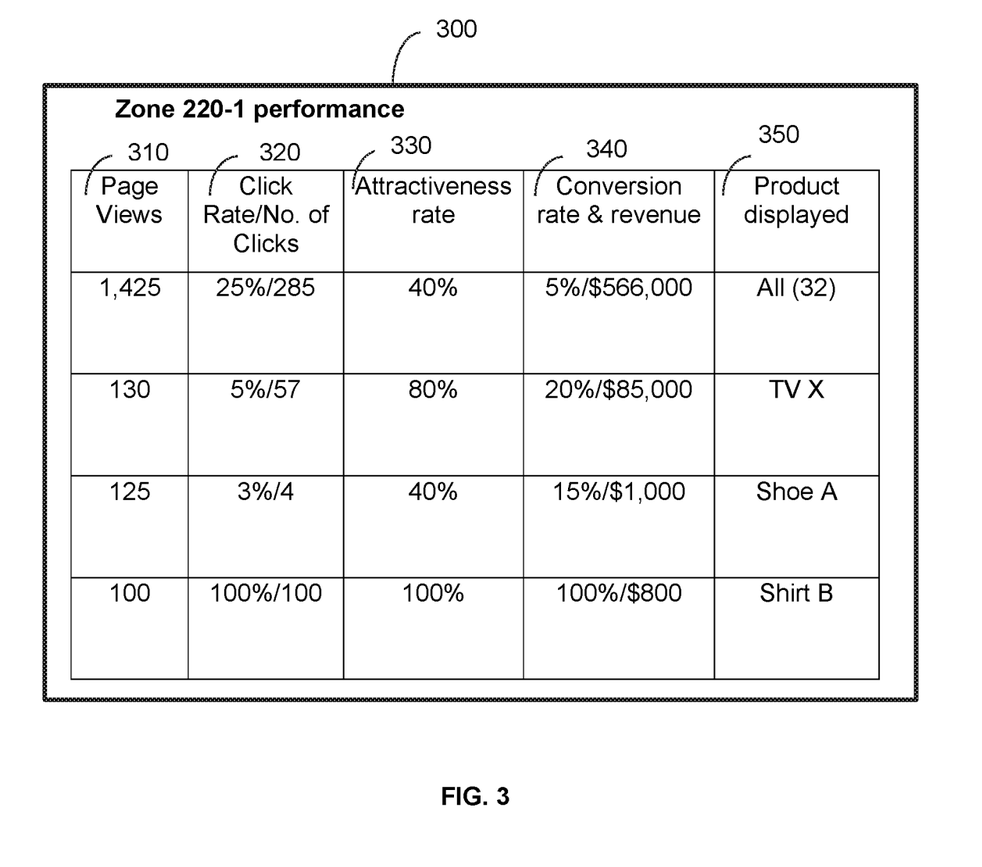
FIG. 3 is a chart depicting performance of various products sold in a zone, according to an embodiment.

FIG. 3 is an example chart 300 depicting performance of various products sold in a zone 230, according to an embodiment. The chart 300 may be displayed on the display 200 of the user device 120, upon selection of a specific zone 230 of the website 210 by the user. The sales data of the products currently or previously sold in the specific zone 230 may be arranged as various predefined KPI and displayed in the chart 300. Each column of the chart shows a particular KPI, while each row depicts a particular product displayed as images 220 in the zone 230. The KPIs may include page views 310, click rate/number of clicks 320, attractiveness rate 330, conversion rate 340, and product revenue, and the name of the product displayed 350.

In an embodiment, page view 310 is the number of times the website 210 including the specific zone 230 with the specific product image 220 has been viewed. Also, the click or selection rate 320 is the percentage in which a click or selection was made by the user, where the product image 220 within the specific zone 230 is also present in the website 210, out of the number of times the user view the website 210 where the specific product image 220 in the zone 230 is present. Further, the number of clicks of each of the product image 220 is a number of times a user clicks or selects something within the website 210 when the product image 220 that is displayed within the zone 230. In an embodiment, besides the specific product image 220, a click, a selection, or a view may be registered or captured and factored into the determination of various KPIs any time action is made on a reference to the specific product. For example, the click, selection, or the view may be captured based on user action on a text with a hyperlink to the specific product that is included within the website 210.

In the embodiment, the attractiveness rate 330 is the percentage of times the user selects the product image 220 or other references (e.g., text links) to the specific product, when they navigated by scrolling through the website 210 to the zone 230. Also, conversion rate 340 is a percentage of the number times the user selects the specific product image 220 or other references (e.g., text links) to the specific product in the zone 230 for a more detailed viewing that resulted in a purchase online, out of the number times the user selects the specific product image 220 or other references (e.g., text links) to the specific product in the zone 230 for a more detailed viewing.

The analytic server 130 is also configured to compare the KPI among the plurality of products displayed in the zone. In an embodiment, the KPI among the plurality of products may also be compared to an average for each KPI category. By comparing the KPI among products and with the average KPI, an attractiveness value may be assigned for each of the products, and certain insights including recommendations may be made from the comparison and the assigned attractiveness values.

For example, when it is determined that a particular product has a high selection rate but a low conversion rate, a mid-range attractiveness value may be assigned, and an insight may be made that the price of the product is too high, or that the product is out of stock, even if the product is easily seen and is attractive among visitors to the website 210. Based on the determination, a recommendation to lower the price of the product through a sale may be made and output to the user device 120. In an embodiment, the determined information may then be sent via the network 110 to the database 150 for storage.

By determining and analyzing KPIs to gather insights on different products displayed in the zone 230 of the website 210, one may determine the effectiveness of product placement in zones located within websites in generating activity from the users. Also, one may determine whether the visibility of the product displayed within a certain zone of the webpage affect the corresponding product's sales.

Figure 4:
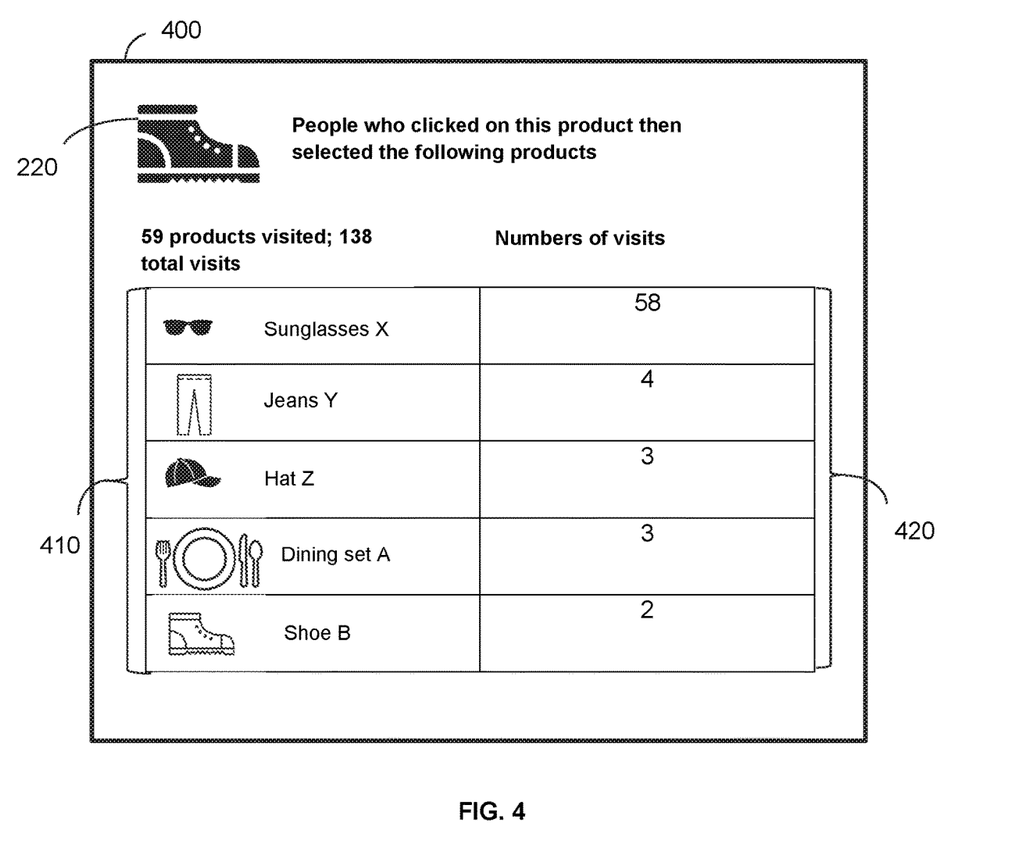
FIG. 4 is a chart showing a list of other products associated with the product displayed in the zone of the website, according to an embodiment.

FIG. 4 is an example chart 400 showing a list of other products associated with the product displayed in the zone of the website, according to an embodiment. In the embodiment, part of the product image 220 or other references (e.g., text links) to the specific product within the zone 230 that has been selected by a user to the website 210 is displayed. Also, the chart 400 also includes a list of other products 410 that the user to the website 210 selected besides selecting the product 220 within the zone 230 for more information, along with a number of visits made 420 to each of these other products 410 by the user.

With the information, a user analyzing information about the product image 220 in the zone 230 can gain insight on other products that are of interest to customers besides the selected product in the zone 230, and may use the information to place those other products near the zone 230 on the website 210 to attract additional views and selection of those other products by the user. Also, for products that are similar to each other, a high number of visits 420 between the two products displayed on the website 210 may reveal that there is high interest by the user for the products, and that they are cross-comparing the products. These products may also each be assigned a high attractiveness value.

Figure 5:
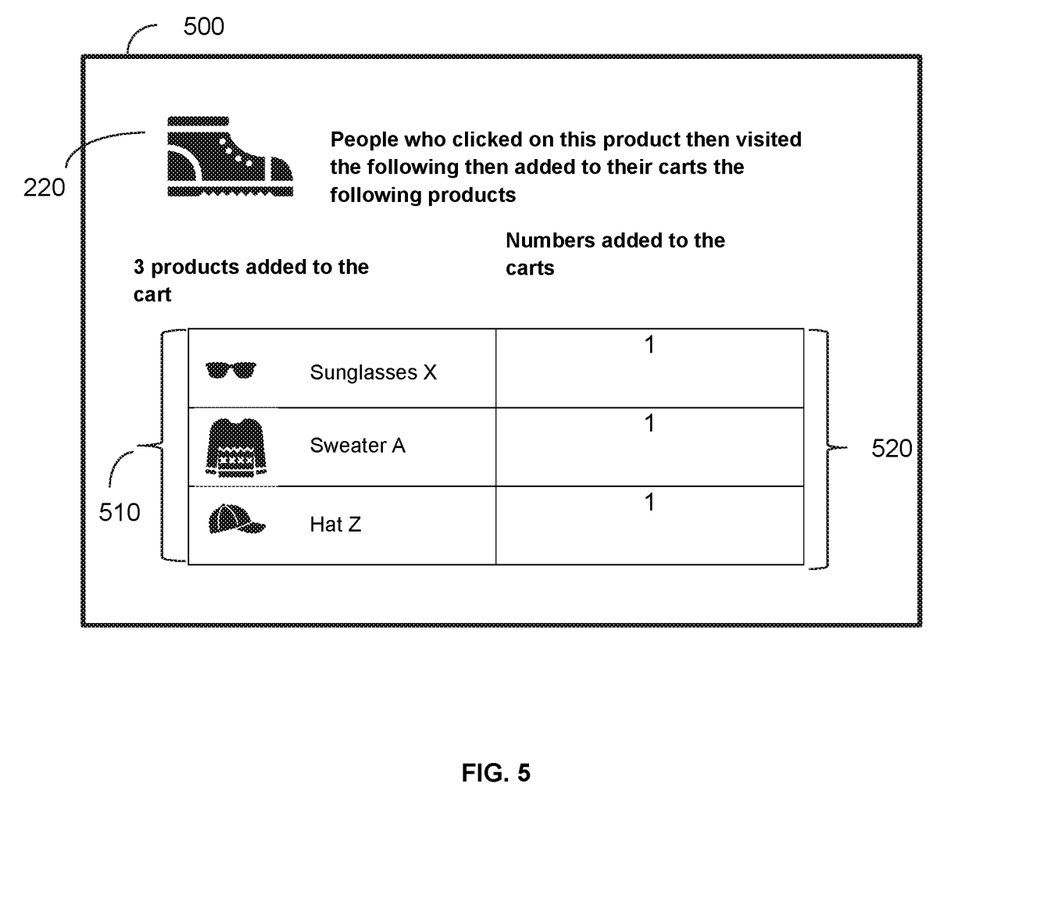
FIG. 5 is a chart showing a list of other products associated with the product displayed in the zone of the website, according to an embodiment.

FIG. 5 is an example chart 500 showing a list of other products associated with the product displayed in the zone of the website, according to an embodiment. In the embodiment, part of the product image 220 or other references (e.g., text links) to the specific product within the zone 230 that has been selected by a user to the website 210 is displayed. Also, the chart 500 also include a list of other products 510 that the user to the website 210 selected to be placed on a virtual cart in consideration for purchase, besides selecting the product 220 within the zone 230 for more information, along with a number of visits made 520 to each of these other products 510 by the user. In an embodiment, the other products 510 may be placed on top of the website 510 above the zone 230, so the user of the website 210 may easily select these other products 510.

With the information, a user analyzing information about the product image 220 or other references (e.g., text links) to the specific product in the zone 230 can gain further insight on other products that are of interest to customers besides the selected product in the zone 230, either as complements of products to purchase, or as rival products to purchase. Also, by comparing the information with which of the products is actually purchased, additional insights could be made. For example, it may be the case that pricing differentials among the products on the virtual cart of similar type that and may have explained why certain products have been purchased, while others are not, or whether certain complementary products displayed in the virtual cart may be displayed in close to each other near the zone 230 on the website 210 to attract additional views and selection of those other products by the user.

Figure 6:
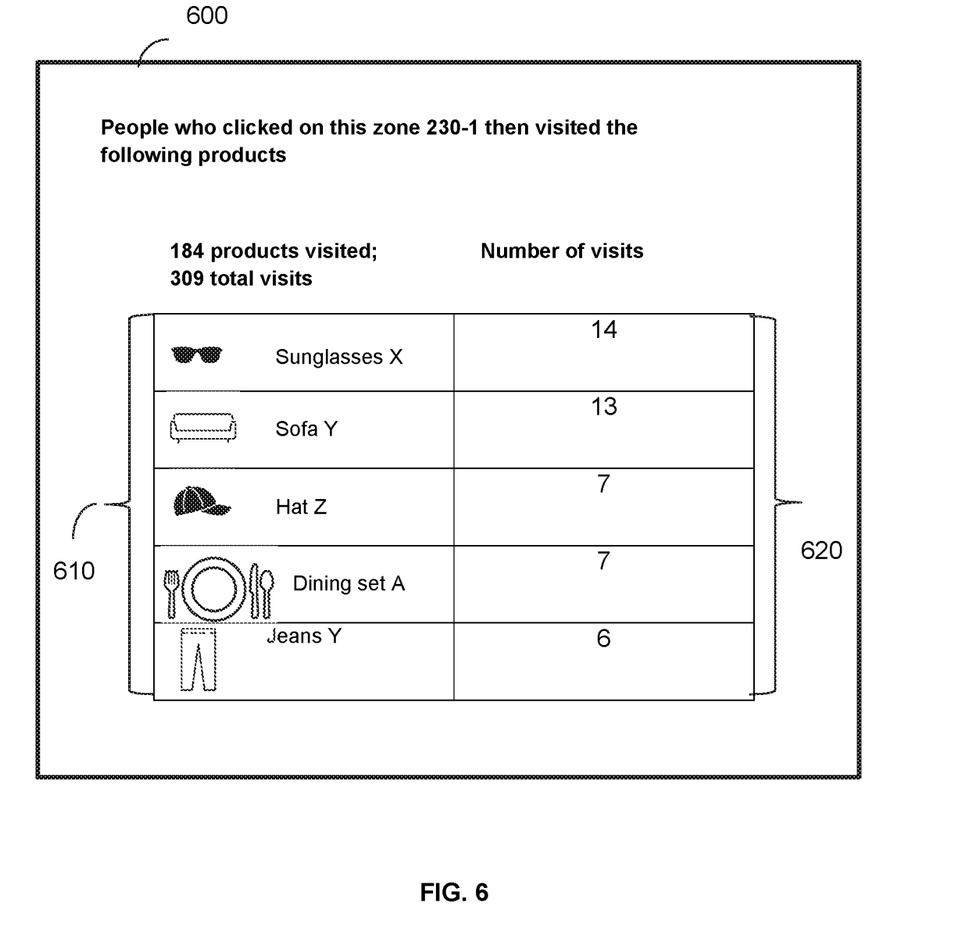
FIG. 6 is a chart showing a list of other products associated with the product displayed in the zone of the website, according to an embodiment.

FIG. 6 is an example chart 600 showing a list of other products associated with the product displayed in the zone of the website, according to an embodiment. In the embodiment, the chart 600 shows a list of other products 610 a user selected to visit, besides selecting a product displayed within the zone 230, as well as the number of visits for each of the products visited 620.

With the information, a user analyzing information about the product image 220 in the zone 230 can gain further insight on the product image 220 other products that are of interest to customers besides the selected product in the zone 230. Also, by comparing the information with which of the products is actually purchased, additional insights could be made. For example, it the number of times the user selected the specific product image 220 within the zone 230 is low compared to the other products visited by the user, it may be the case that the product image 220 is not attractive to the user, and that the product image 220 within the zone 230 should be replaced.

Figure 7:
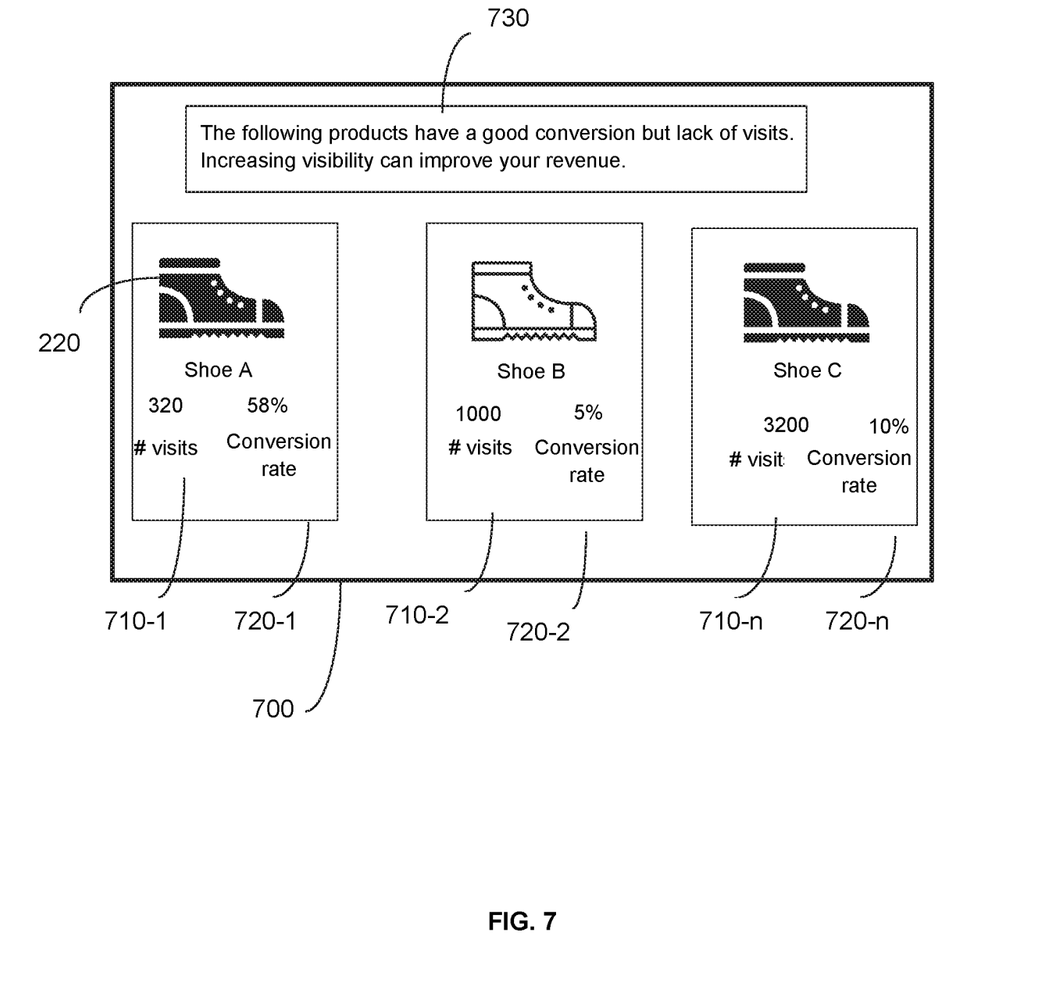
FIG. 7 is a chart showing a KPI comparison of products displayed in the zone of the website, according to an embodiment.

FIG. 7 is an example chart 700 showing a KPI comparison of products displayed in the zone of the website, according to an embodiment. In the embodiment, KPIs of a product image 220 that is currently displayed in the zone 220 of the website 210 is compared with other similar products of different brands or subtle design differences. Here, the KPIs include number of visits or selections to view the product image 220 or other references (e.g., text links) to the specific product in more detail 710-1 to n (hereinafter number of visits 710) and conversion rate of the product 720-1 to n (hereinafter conversion rate 720). As discussed previously to FIG. 3, conversion rate is a percentage of the number times the user selects the specific product image 220 or other references (e.g., text links) to the specific product in the zone 230 for a more detailed viewing that resulted in a purchase online, out of the number times the user selects the specific product image 220 in the zone 230 for a more detailed viewing.

By analyzing the number of visits to the website 710 of the individual products, and the conversion rate 710 once the user selects the website to actually purchase the product, it may be determined whether the lack of selection of a specific product image 220 or other references (e.g., text links) to the specific product within a zone 230 may be due to the attractiveness of the product or the price of the product compared to other similar products that are placed in the same zone 230 within the website 210. In this case, a high attractiveness value may be assigned for the highly-selected product, and a lower attractiveness value may be assigned for the less selected product. In an embodiment, The interface 210 may also display a recommendation 730 on the top part of the interface 210 based on the analysis.

For example, shoes A-C are displayed on the interface 210. For each of the shoes A-C the number of visits or selections 710 made by the user to the zone 230 within the website 210 is shown, as well as the conversion rate of the shoes, that is, the percentage of the visits to the individual website that results in a sale. In the example, Shoe A may have a low number of visits to the website, but may have a high conversion rate of 58% when users of the advertisement website do select the advertisement. Based on the information, it may be ascertained that the discrepancy of low website visitation number, but high conversion rate may be due to the placement of the advertisement for Shoe A. Once a customer sees shoe A on the website 210, the customer is likely to visit.

Also, the information may be further enhanced by comparing all product within particular zones of the interface 310 in which they are placed. In comparing shoes A-C, even though they were all placed in the same zone 230, the number of visits 710 and conversion rate greatly vary. Here, it could be the case that the pricing of shoe A, which is much cheaper than shoes B and C is to explain for the high conversion rate once the customer sees shoe A.

Figure 8:
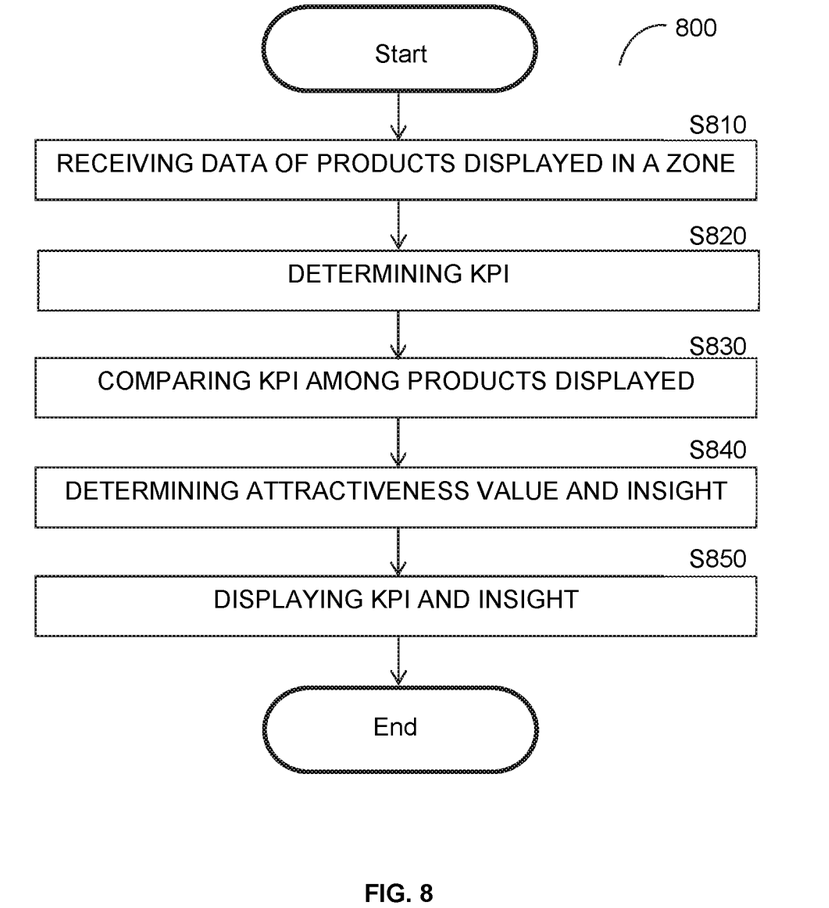
FIG. 8 is an example diagram of a method of determining product placement effectiveness, according to an embodiment.

FIG. 8 is an example flowchart 800 of a method for determining product placement effectiveness, according to an embodiment. The method as described may be performed by an analytic server 130.

At S810, sales data including Key Performing Indicators (KPI) on a plurality of products displayed in a zone of a webpage is received. Then, at S820, one or more KPIs are determined from the received sales data. In an embodiment, such KPIs may include page views, click or selection rate/number of clicks, attractiveness rate, conversion rate, product revenue, the name of the product displayed, and the like, the details of each KPI being explained in detail with reference to FIG. 3, above.

At S830, the KPIs among the plurality of products displayed in the zone are compared. For example, the selection or the conversion rate of the plurality of the products may be compared as a factor on which image of the products is generating more value when it is placed in the zone of the interface of the display. In an embodiment, the KPI among the plurality of products may also be compared to an average for each KPI category. Afterwards, at S840, an attractiveness value is determined for each of the products, and an insight including a recommendation is created, based on the comparison. For example, when it is determined that a particular product has a high selection rate but a low conversion rate, a relatively high attractiveness value that also takes into account the lower conversion rate may be assigned for that particular product, and an insight may be made that the price of the product is too high, or that the product is out of stock. Therefore, it may be recommended that the price of the product be reduced, or that more products be ordered to be in stock for future sale. In another embodiment, when it is determined that there is a high conversion rate, but low number of sales, it may be determined that there is a lack of visibility for the image of the specific product when it is displayed in the zone of the interface of the display on the user device. Therefore, it may be suggested that the user change the location of the image that is displayed in the zone of the interface. Further, at S850, an image of the plurality of products, the KPI, and the insight are displayed on the display.

Figure 9:
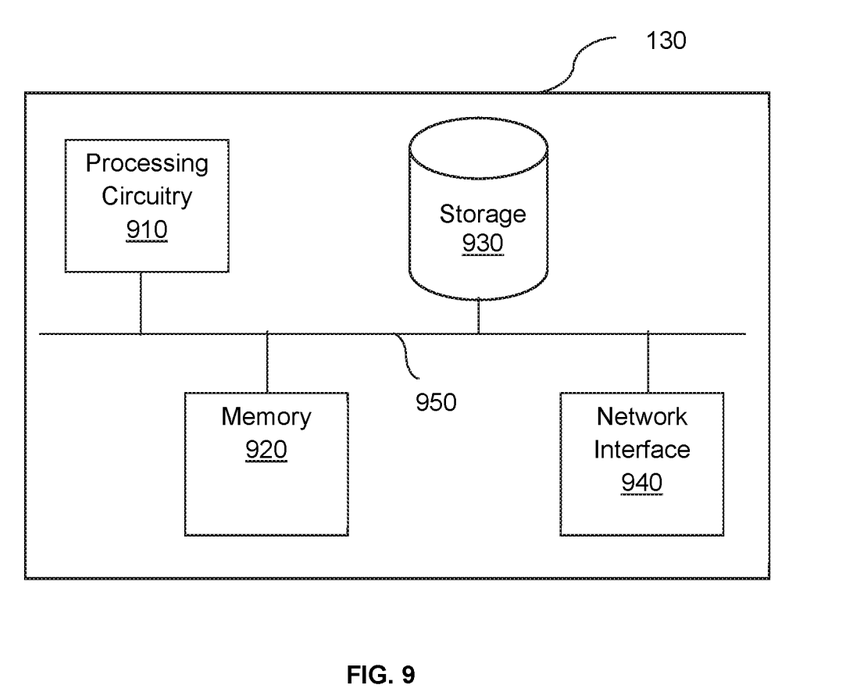
FIG. 9 is diagram of the analytic server, according to an embodiment.

FIG. 9 is an example block diagram of the analytic server 130, according to an embodiment. The system 130 includes a processing circuitry 910 coupled to a memory 920, a storage 930, and a network interface 940. In an embodiment, the components of the system 130 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 930.

In another embodiment, the memory 920 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, CD-ROM, Digital Versatile Disks (DVDs), or any other medium which can be used to store the desired information.

The network interface 940 allows the analytic server 130 to communicate with the web server 140 for the purpose of, for example, receiving data, sending data, and the like. Further, the network interface 940 allows the analytic server 130 to communicate with the database 150 for the purpose of collecting information regarding the product.

It should be understood that the embodiments described herein are not limited to the specific architecture illustrated in FIG. 9, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
receiving, by a hardware processor of a server, a webpage analysis request of a webpage;
extracting, by the hardware processor of a server, contents of the webpage from one or more web servers;
accessing archive data in a database;
based on the archive data, determining, by the hardware processor of the server, a plurality of zones of the webpage, each zone in the plurality of zones associated with a predefined area within the webpage that is selectable by a user of the webpage;
identifying, by the hardware processor of the server, a plurality of products displayed in the plurality of zones;
detecting, by the hardware processor of the server, from a plurality of user computer devices, user selections in a zone of the plurality of zones in the webpage;
in response to the user selections in the zone, determining, by the hardware processor, key performing indicators (KPI) for each product of the plurality of products, wherein the determined KPI comprise a number of user selections of product references associated with each product and a conversion rate associated with each product,
wherein the KPI for each product of the plurality of products further comprises:
a number of page views, a click rate, an attractiveness rate, and a product revenue,
wherein the click rate for a product is based on a number of times the users that are navigating the webpage select an item within the webpage that displays the product in a zone of the webpage,
wherein the attractiveness rate for the product is based on a percentage of users that are navigating to the zone of the webpage that displays the product and select, in the zone, a product reference associated with the product;
determining, by the hardware processor of the server, that the conversion rate of the product is higher than the conversion rates of other products in the webpage, and that the product revenue of the product is lower than the product revenues of the other products in the webpage;
in response to determining that the conversion rate of the product is higher than the conversion rates of other products in the webpage, and that the product revenue of the product is lower than the product revenues of other products in the webpage, automatically determining, by the hardware processor of the server, that there is a lack of visibility of an image associated with the product when it is displayed in the zone of the webpage; and
in response to the determination, causing display, by the hardware processor of the server, of a graphical user interface on a client device, the graphical user interface comprising the plurality of products, the determined KPI for each product of the plurality of the products, and recommendations for the product, the recommendations based on the determination and the attractiveness rate.

2. The method of claim 1, wherein the plurality of zones are different areas of display included in the webpage.

3. The method of claim 1, wherein, for each product of the plurality of products, the number of page views is based on a number of times each product of the plurality of products displayed in the plurality of zones has been viewed by the users that are navigating the webpage.

4. The method of claim 1, wherein, for each product of the plurality of products, the conversion rate is based on a number of completed purchases associated with each product resulting from the user selections of product references associated with each product.

5. A non-transitory computer readable medium having stored thereon instructions for causing a processing circuitry to execute a process, the process comprising:
receiving a webpage analysis request of a webpage;
extracting contents of the webpage from one or more web servers;
accessing archive data in a database;
based on the archive data, determining a plurality of zones of the webpage, each zone in the plurality of zones associated with a predefined area within the webpage that is selectable by a user of the webpage;
identifying, a plurality of products displayed in the plurality of zones;
detecting from a plurality of user computer devices, user selections in a zone of the plurality of zones in the webpage;
in response to the user selections in the zone, determining key performing indicators (KPI) for each product of the plurality of products, wherein the determined KPI comprise a number of user selections of product references associated with each product and a conversion rate associated with each product,
wherein the KPI for each product of the plurality of products further comprises:
a number of page views, a click rate, an attractiveness rate, and a product revenue,
wherein the click rate for a product is based on a number of times the users that are navigating the webpage select an item within the webpage that displays the product in a zone of the webpage,
wherein the attractiveness rate for the product is based on a percentage of users that are navigating to the zone of the webpage that displays the product and select, in the zone, a product reference associated with the product;
determining that the conversion rate of the product is higher than the conversion rates of other products in the webpage, and that the product revenue of the product is lower than the product revenues of the other products in the webpage;

in response to determining that the conversion rate of the product is higher than the conversion rates of other products in the webpage, and that the product revenue of the product is lower than the product revenues of other products in the webpage, automatically determining that there is a lack of visibility of an image associated with the product when it is displayed in the zone of the webpage; and in response to the determination, causing display of a graphical user interface on a client device, the graphical user interface comprising the plurality of products, the determined KPI for each product of the plurality of the products, and recommendations for the product, the recommendations based on the determination and the attractiveness rate.

6. A system comprising:

a processing circuitry; and a memory, the memory containing instructions that, when executed by the processing circuitry, configure the system to perform operations comprising:

receiving a webpage analysis request of a webpage;

extracting contents of the webpage from one or more web servers;

accessing archive data in a database;

based on the archive data, determining a plurality of zones of the webpage, each zone in the plurality of zones associated with a predefined area within the webpage that is selectable by a user of the webpage;

identifying, a plurality of products displayed in the plurality of zones;

detecting from a plurality of user computer devices, user selections in a zone of the plurality of zones in the webpage;

in response to the user selections in the zone, determining key performing indicators (KPI) for each product of the plurality of products, wherein the determined KPI comprise a number of user selections of product references associated with each product and a conversion rate associated with each product, wherein the KPI for each product of the plurality of products further comprises:

a number of page views, a click rate, an attractiveness rate, and a product revenue, wherein the click rate for a product is based on a number of times the users that are navigating the webpage select an item within the webpage that displays the product in a zone of the webpage, wherein the attractiveness rate for the product is based on a percentage of users that are navigating to the zone of the webpage that displays the product and select, in the zone, a product reference associated with the product;

determining that the conversion rate of the product is higher than the conversion rates of other products in the webpage, and that the product revenue of the product is lower than the product revenues of the other products in the webpage;

in response to determining that the conversion rate of the product is higher than the conversion rates of other products in the webpage, and that the product revenue of the product is lower than the product revenues of other products in the webpage, automatically determining that there is a lack of visibility of an image associated with the product when it is displayed in the zone of the webpage; and in response to the determination, causing display of a graphical user interface on a client device, the graphical user interface comprising the plurality of products, the determined KPI for each product of the plurality of the products, and recommendations for the product, the recommendations based on the determination and the attractiveness rate.

7. The system of claim 6, wherein the plurality of zones are different areas of display included in the webpage.

8. The system of claim 6, wherein, for each product of the plurality of products, the number of page views is based on a number of times each product of the plurality of products displayed in the plurality of zones has been viewed by the users that are navigating the webpage.

9. The system of claim 6, wherein, for each product of the plurality of products, the conversion rate is based on a number of completed purchases associated with each product resulting from the user selections of product references associated with each product.

* * * * *

UNITED STATES PATENT AND TRADEMARK OFFICE
CERTIFICATE OF CORRECTION

| | | |
|---|---|---|
| PATENT NO. | : 12,182,842 B2 | Page 1 of 1 |
| APPLICATION NO. | : 17/032166 | |
| DATED | : December 31, 2024 | |
| INVENTOR(S) | : Colombier et al. | |

It is certified that error appears in the above-identified patent and that said Letters Patent is hereby corrected as shown below:

In the Specification

In Column 6, Line 9, delete "230," and insert --220,-- therefor

In Column 7, Line 57, delete "510" and insert --210-- therefor

In Column 8, Line 31, delete "220" and insert --230-- therefor

In Column 9, Line 9, delete "310" and insert --210-- therefor

Signed and Sealed this
Thirtieth Day of December, 2025

John A. Squires
*Director of the United States Patent and Trademark Office*